May 24, 1966  R. MALLRICH  3,252,486
FILLING APPARATUS FOR LIQUIDS
Filed Dec. 15, 1961  8 Sheets-Sheet 2

INVENTOR
Rudolf Mallrich
By

May 24, 1966  R. MALLRICH  3,252,486
FILLING APPARATUS FOR LIQUIDS
Filed Dec. 15, 1961  8 Sheets-Sheet 5

INVENTOR
Rudolf Mallrich
By

INVENTOR
Rudolf Mallrich
By

May 24, 1966  R. MALLRICH  3,252,486
FILLING APPARATUS FOR LIQUIDS
Filed Dec. 15, 1961  8 Sheets-Sheet 7

FIG. 12

INVENTOR
Rudolf Mallrich
By

May 24, 1966 R. MALLRICH 3,252,486
FILLING APPARATUS FOR LIQUIDS
Filed Dec. 15, 1961 8 Sheets-Sheet 8

FIG.13

INVENTOR
Rudolf Mallrich
By
Walter Becker

United States Patent Office 3,252,486
Patented May 24, 1966

3,252,486
FILLING APPARATUS FOR LIQUIDS
Rudolf Mallrich, Bad Kreuznach, Germany, assignor to Seitz Werke G.m.b.H., Bad Kreuznach, Germany
Filed Dec. 15, 1961, Ser. No. 160,422
Claims priority, application Germany, Dec. 24, 1960, S 71,828
10 Claims. (Cl. 141—59)

The present invention relates to a filling apparatus for filling liquids and, more specifically, concerns a filling apparatus for filling liquids under counter pressure and with separate chambers for air under pressure, return air and liquid respectively. Filling apparatuses of this type with a plurality of chambers for the gas or air zone and the liquid zone are designed as stopcock fillers where the individual operations are adapted to be controlled by manipulation of the stopcock. When employing higher emptying pressures, a stopcock is not very suitable as an emptying cock because the required tight seal is for all practical purposes not obtainable.

With one-chamber filling apparatus, valves have been employed as filling members. With such one-chamber filling apparatus the number of the control operations is relatively low so that a simple construction of the filling apparatus will be obtained. With a filling apparatus with three separate chambers, it is necessary that the individual control operations be carried out in the gas zone as well as in the liquid zone in such a way that a sufficient safety of operation will be assured.

It is an object of the present invention to provide a filling apparatus for filling liquids under counter pressure with separate chambers for air under pressure, return air and liquid, which will overcome the above mentioned drawbacks.

It is another object of this invention to provide a filling apparatus for filling liquids as set forth in the preceding paragraph, which will be relatively simple in construction and will be safe in operation.

These and other objects and advantages of the invention will appear more clearly from the following specification in connection with the accompanying drawings, in which.

*General arrangement*

The filling apparatus according to the present invention for filling liquids under counter pressure, which comprises separate chambers for air under pressure, return air and liquid respectively, is characterized primarily in that it comprises control means separate from the liquid filling member for controlling the preloading air and return air separated from each other, while said control movement of said control means is adapted simultaneously to influence the filling member in an opening or closing direction. The control of the pre-loading air and return air and also the control for the compensating position as well as the pressure release and also the blowing out of the return air and filling pipe is effected by means of said control means, whereas a control valve is employed for controlling the liquid. This valve is so arranged that it may simultaneously be actuated when said control means is actuated.

Said control means is advantageously designed as rotary slide valve the shaft of which is provided with an eccentric or similarly effective means for actuating the liquid control valve.

For purposes of simplifying the structure of the entire filling apparatus, the rotary shaft of the control means may extend through the liquid chamber of the filling apparatus in order in this way to obtain direct mechanical control of the liquid filling member. The liquid filling member may be provided with or without a filling tube. In this connection it is merely necessary to exchange the holder or fitting for the filling valve, whereas the remaining portion of the filling member will remain unchanged.

When employing a shut-off valve, for instance a float, in the return air conduit, which is necessary with a three-chamber system, the control member intended for the gas zone may be employed for the purpose of bypassing the shut-off member in the return air conduit prior to the filling position. In this way the danger of a closing of the shut-off member, for instance of the float, will be avoided when after completing preloading, the apparatus is adjusted for liquid. The housing of the filling member is connected to the bottom of the liquid reservoir, and the said control member for the gas portion is arranged directly on the housing of the filling valve. This will result in a particularly simple compact construction which will also facilitate the replacement of the heretofore employed filling means by the new filling means without materially affecting the entire structure of the filling apparatus.

In general, the present invention relates to a three chamber bottle filler. By this is meant a filler in which the filling is effected under counter pressure. To this end, the bottle is pre-loaded with air or carbonic acid. Subsequently, the liquid is filled into the pre-loaded bottle. The air or carbonic acid which is displaced during this operation from the bottle, will thus be able to escape. The tensioning or compressed gas will be withdrawn from a chamber in the filler and also the liquid. The return gas is in its turn returned to another chamber. The characteristic feature of this filler consists in that the chambers are separated from each other and thereby a substantially quiescent movement of the liquid into the bottles will be effected while, in particular, during the handling of beer the harmful influences of oxygen will be prevented.

*Structural arrangement*

Referring now to the drawings in detail and, more specifically, to the filling apparatus illustrated in FIGS. 1 to 3, 12 and 13, the filling apparatus shown therein represents a rotatable filling apparatus which comprises an annular fluid reservoir 10 with a bottom 11 and an annular chamber 12 for the pre-loading air. Channel 12 will be seen in FIGS. 1, 2, and 13. Connected to the bottom 11 of the fluid reservoir 10 at each of a plurality of filling stations is a housing 13 of a filling device. The lower portion of said filling device comprises a member 14 connected to a fitting 15 for a filling pipe 16 by means of a box nut 17. Connected to the housing 13 is a valve member comprising a rotary slide valve disc 18 and a rotary slide valve face 19 adapted to be controlled by a pinion or actuating member 20 or the like. Pinion 20 is keyed to a shaft 21 provided with an eccentric 22. One end of shaft 21 is journalled in a thrust bearing 23 which is covered by a cap 24 threaded into housing 13 and sealed relative thereto by a seal or gasket 24a. A spring 25 brings about the sealing pressure between the parts 18 and 19 by continuously pressing member 19 against member 18, whereas the thrust bearing 23 absorbs the pressure exerted by spring 25. Housing 13 is provided with a longitudinal bore 26 for the liquid and communicates through a corresponding bore 27 in the bottom 11 of the fluid reservoir with the interior of the latter. The lower portion of bore 26 has an increased diameter and has mounted therein a valve 28 for controlling the flow of liquid therethrough. Said valve 28 is continuously urged into open position by means of a spring 29 having one end resting on an inwardly extending flange 13a of housing 13, whereas the other end of spring 29 rests against a spring cap 29a connected to the shank of valve 28 by a spring ring 29b. Valve 28 is normally held in its closing position by said eccentric 22. Groove means in the face of valve face 19 that engages valve disc 18 controls communication between the bores.

A conduit or passage 30 leads from the preload air chamber 12 to the valve member 18 which is provided with axial bores. In one position of valve face 19, passage 30 is adapted to communicate through passage 31 in housing 14 with the upper end of the filling tube 16. Passage 32 opens to the outside of tube 16. The passages 31, 32 serve as so-called compensating conduits through which the preloading air is adapted to pass into the container to be filled.

Figures 2, 3:
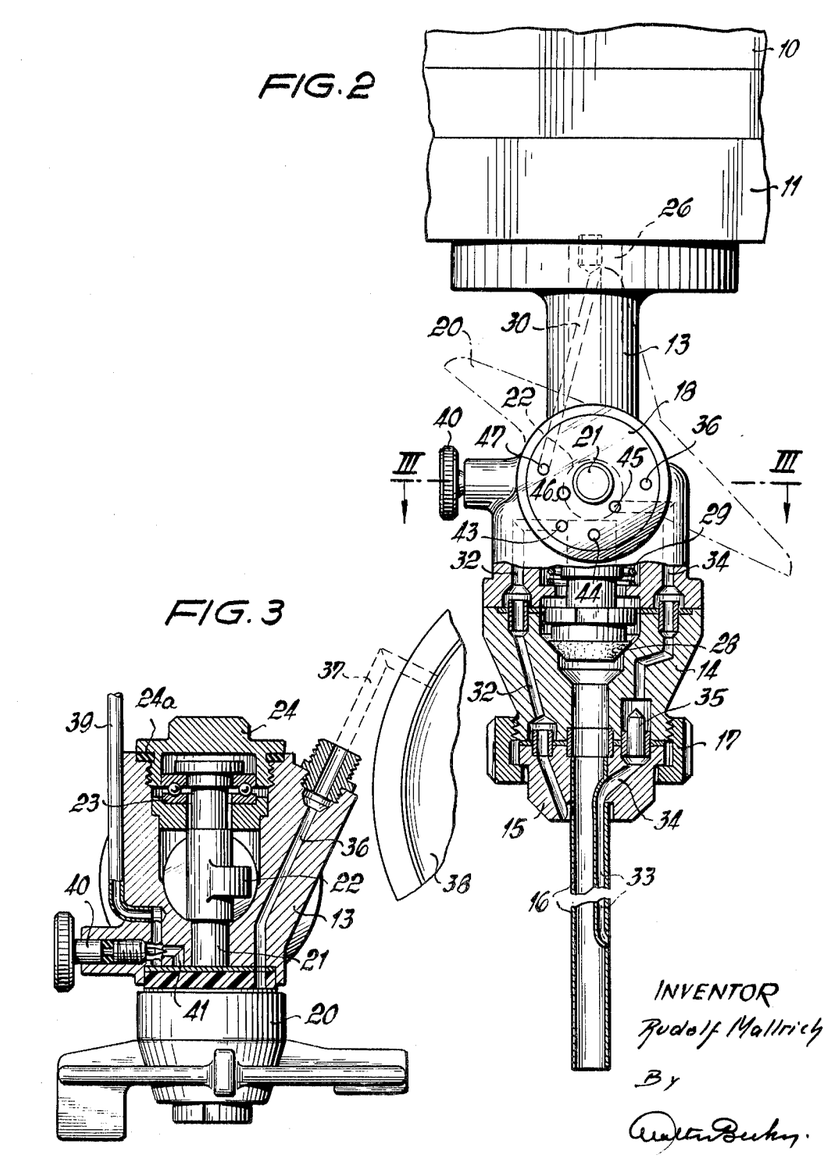
FIG. 2 is a section taken along the line II—II of FIG. 1.
FIG. 3 is a horizontal section through the filling apparatus according to FIGS. 1 and 2, said section being taken along the line III—III of FIG. 2.

The return air conduit in the filling tube 16 is shown in FIG. 2 and is designated with the reference numeral 33. The return conduit 33 is continued by conduit 34. Arranged in conduit 34 is a float 35 which shuts off the return air conduit whenever the liquid rises in the return air conduit. Past float 35, the return air conduit leads to bore 45 in valve disc 18. Bore 45, in one position of valve face 19, connects to conduit 36 adapted to communicate with a conduit 37 leading into a central return air chamber 38, see FIGS. 12 and 13. All return air conduits 37 of the individual members are connected to said chamber 38. The arrangement furthermore comprises a conduit 39 for the pressure relief, which conduit 39 has built thereinto a throttle 40 (see FIG. 3). It is understood that, as is conventional with bottle filling machines, tube 16 extends down into the bottle while the neck of the bottle is sealed to nut 15 outwardly from the end of passage 32.

The filling machine according to the present invention, and as is substantially conventional, comprises a stationary outer frame part 9 within which the aforementioned structure is rotatable. This permits the bottles to be loaded and unloaded from the machine at one point as is also conventional in the bottle filling trade. At the top of frame 9 there is a stationary ring 8 and mounted on the ring are stationary support elements 61 which carry the abutment members 60 which project into the path of the control member 20. By properly locating the control members 60 about the frame, they will be located so as to engage and actuate the control members 20 as the rotatable portion of the machine rotates within frame 9. Thus, as the bottles move from position to position, the actuating members 60 will effect rotation of control member 20 from one position to another and thus effect the connections between the interior of the bottle and the three chambers of the machine, above described, that are necessary for carrying out a filling operation according to the present invention. The several operative positions of control member 20 are discussed in the following paragraphs.

Figure 6:
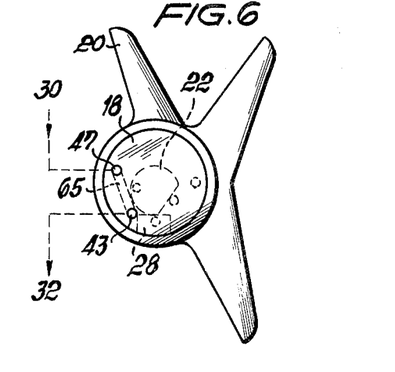
FIGS. 6, 7, 8, 9, 10 and 11 respectively diagrammatically illustrate different control positions of the control member.
Figure 6A:
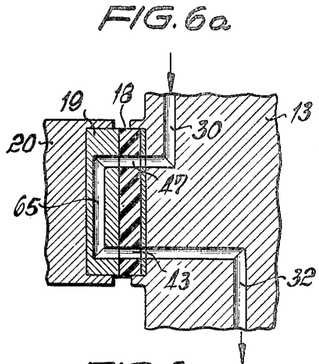
FIGS. 6a, 7a, 8a, 9a, 10a and 11a, are cross-sectional views corresponding to FIGS. 6, 7, 8, 9, 10 and 11, respectively, illustrating the connections in the control positions of the control member.

Referring now to FIGS. 6 to 11 illustrating various control positions of the control member 20, reference may first be had to FIG. 6 which shows the control member 20 valve and the slide valve parts 18, 19 in preload air position. The pre-loading air passes in the direction of the arrow from passage 30 through bore 47 in valve disc 18 and then through a groove in valve face 19 to bore 43 in valve disc 18 and thence to the passage 32 and from there into the bottle or vessel to be filled, being introduced into the bottle on the outside of the filling tube 16.

Figure 7:
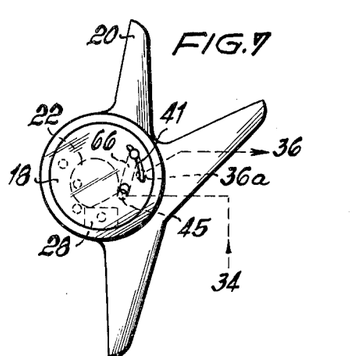

According to the position of control member 20 in FIG 7, a groove 41 establishes communication between the bottle to be filled and the return air chamber 38 so that the preloading air can pass from the bottle through groove 41 into the return air chamber 38. In this position of control member 20, the liquid control valve 28 is still closed by the eccentric 22 as was the case in the position of control member 20 as shown in FIG. 6. The circuit is such that float 35 in the return air conduit 34 is bypassed so that the interior of the bottle will be in direct communication with the return air chamber 38. Consequently, no danger exists that the float 35 will be moved in view of the difference in pressure between preloading air chamber 12 and return air chamber 38.

Figure 8:
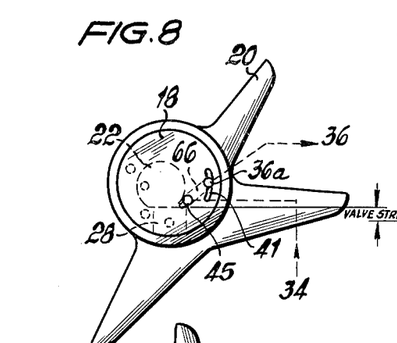

When control member 20 is moved from its FIG. 7 position into its FIG. 8 position at the air side, the connection with the return air conduit will be opened through the float 35, while the preloading air will be turned off and simultaneously valve 28 will be released by the eccentric 22 so that it will open in view of the thrust of spring 29.

Figure 9:
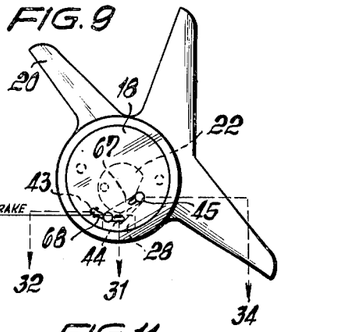

Following the filling of the bottle, the control member 20 will move into the position of FIG. 9. In this position the preloading air bore 43, the equalizing bore 44 and the return air bore 45 will be interconnected. Bore 44 leads through passage 31 into the upper end of the filling tube 16. In this equalizing position the liquid will drop from filling tube 16 and return air passage 34 into the bottle under pressure, and the liquid conduit and return conduit will then be emptied.

According to the position of control member 20 in FIG. 10, the preloading air conduit below the valve member 18, the equalizing conduit and the return conduit are still interconnected. Simultaneously, however, the relief conduit 46 is freed so that a relief toward the outside will take place through choke 40 and conduit 39. The bottle is in this way filled and will be withdrawn from the filling member and from the filler in customary manner. Between the start and end positions of the filler there exists a further control position in which by means of the preloading air bore 47 in slide valve 18, 19 a connection is established with the return air bore 45 so that the liquid residues which may be left in the return air and also the liquid residues in the equalizing bore will be blown out. Similarly, liquid residues remaining in the filling tube will be blown out through the equalizing bore 44. Thereupon, the control member 20 again reaches its FIG. 6 position.

Control member 20 is in a manner known per se equipped with a plurality of control arms which engage corresponding abutments or dogs fixedly connected to the circumference of the frame of the filler, whereby the individual control positions are brought about. These abutments will be seen at 60 in FIGS. 1 and 13. Thus, the control member 18, 19, 20 controls all control positions occurring in the gas zone and simultaneously also controls the liquid valve 28. In this way, control member 18, 19, 20 simultaneously takes over the actuation of the liquid filling valve at the corresponding control positions.

FIGURES 6a to 11a, corresponding to FIGURES 6 to 11, respectively, show the control members 18, 19 of the filling elements in cross-section in the positions respectively required for the filling operation. During the preloading operation of the bottles to the pressure of the liquid to be bottled (see FIGURES 6 and 6a), the disc 19 connected with the control pinion 20 and the shaft 21 (see FIGURES 1 and 3) so as to rotate therewith is made to coincide with the disc 18 in such a way that the preloading air coming from the conduit 30 and bore 47 in the direction of the arrow flows into the bottle through the channel 65 of disc 19 and subsequently through the bore 43 and conduit 32.

Figure 7A:
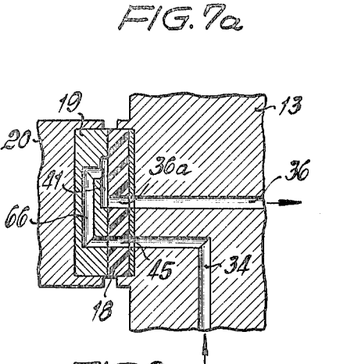

In the position according to FIGURES 7, 7a, the return air conduit 34 and the bore 45 thereof communicates with the bore 36a and the conduit 36 leading to the return air chamber 38 through the intervention of the channel 66 and the groove 41 of the disc 19, so that the preloading air may flow to the return air chamber over this path. In this position, the eccentric 22 keeps the liquid valve 28 closed, as is likewise the case in the position according to FIGURES 6 and 6a.

Figure 8A:
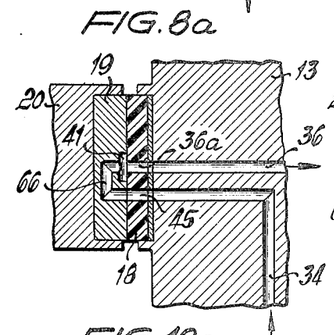

In the position according to FIGURES 8 and 8a representing the filling position, the return air connection is by way of the conduit path 34, 45, 66, 41, 36a and 36. The only change with regard to the position according to FIGURES 7 and 7a consists in that the disc 19 and thereby the eccentric 22 has been turned in clockwise direction until the valve 28 is freed by the eccentric 22, and the valve may open up under the influence of the spring 29.

Figure 9A:
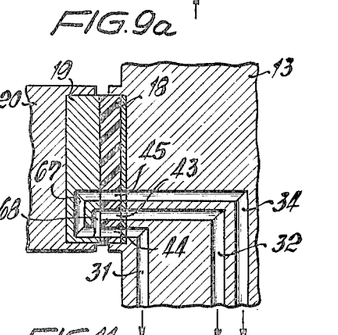

When the bottle is filled, the disc 19 reaches the position shown in FIGURES 9 and 9a whereby the equalizing effect referred to is obtained. In this equalizing position, the equalizing bore is in communication with the conduit 31, 44 through the channel 67 and the groove 68 of disc 19 with the preloading air bore 43 and the conduit 32 associated therewith as well as with the return air bore 45 and conduit 34 associated with the latter. In this equalizing position, the liquid drops under pressure into the bottle from the filling pipe 16 and the return air conduit 34, 33 so that the liquid conduit 16 and the return air conduit 34, 33 are emptied.

Figure 10:
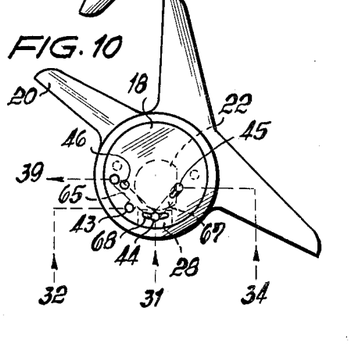
Figure 10A:
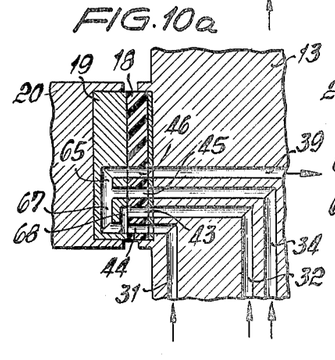

In the position shown in FIGURES 10, 10a the channel 67 and the groove 68 of disc 19 still connect the conduit 31, 44 with the conduits 32, 43 and 34, 45. Through the intervention of the channel 65 of the disc 19 the relief bore 46 and the relief conduit 39 are located in the abovementioned conduit connection so that the relief is effected toward the outside through the intervention of the throttle 40 (see FIGURE 3). The bottle is now filled and is withdrawn from the filling member and leaves the filling apparatus in the customary manner.

Figure 11:
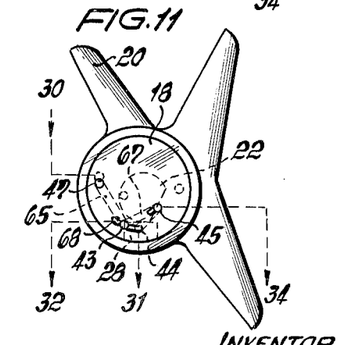
Figure 11A:
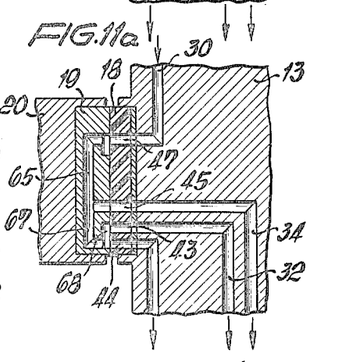
Figure 12:
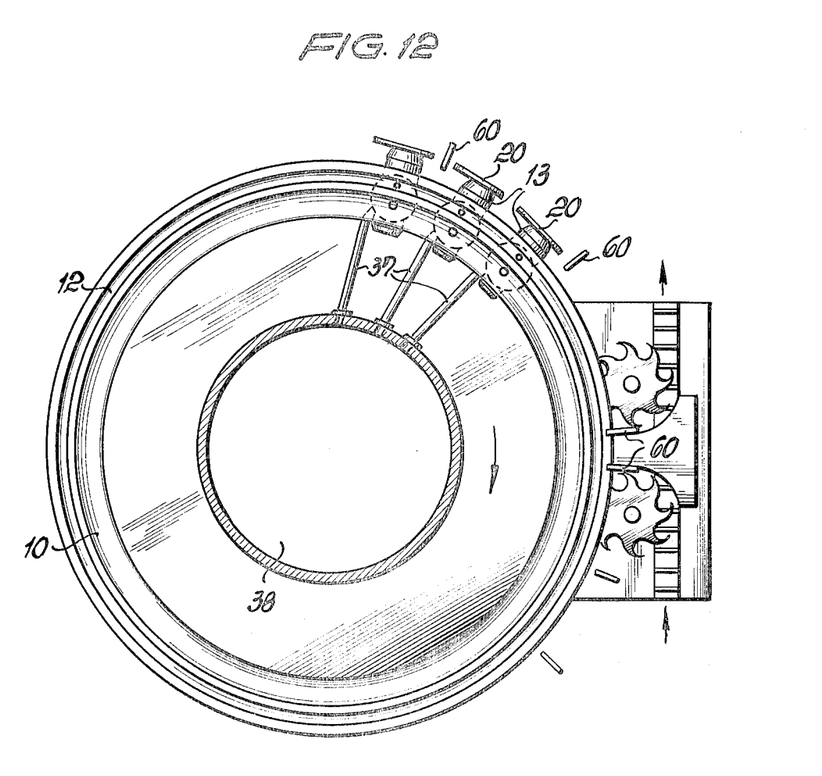
FIG. 12 is a plan view of a multiple station filler, drawn somewhat diagrammatically.
Figure 13:
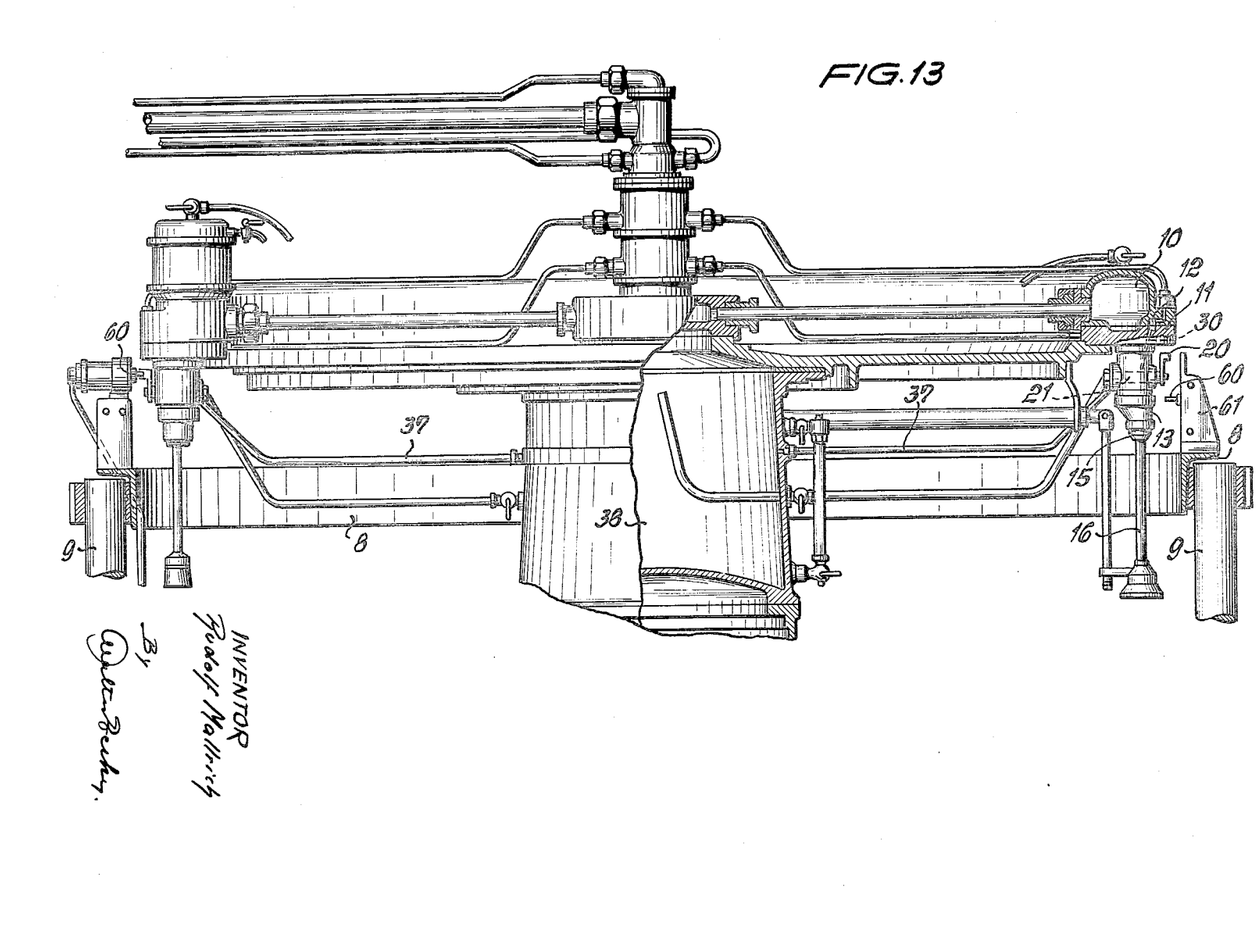
FIG. 13 is a vertical sectional view showing the upper portion of a filling device.

In the position shown in FIGURES 11 and 11a, the connection with the relief conduit 46, 39 is interrupted and the connection which continues to exist between the conduits 31, 44, 32, 43, 34, 45 and the groove 68 by way of the channel 67 is brought into communication with the preloading air bore 47 and the conduit 30 thereof by means of the channel 65.

Due to this arrangement, the remainder of the liquid present in the return air conduit 45, 34 and in the preloading air conduit 43, 32, is removed. Through the intervention of the equalizing bore 44 and the conduit 31, simultaneously the remaining liquid adhering to the filling pipe 16 is blown out.

Figure 1:
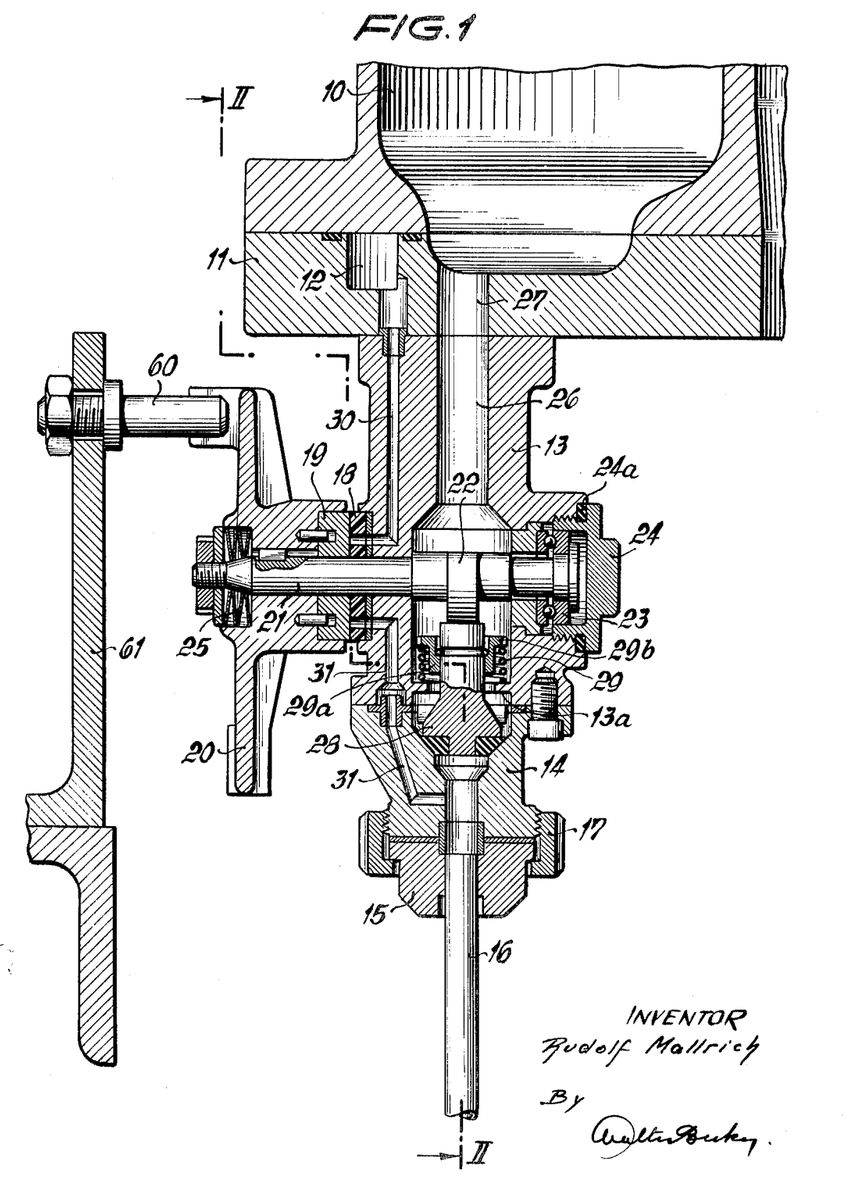
FIG. 1 is a vertical section through a rotatable three-chamber filling apparatus according to the present invention.
Figure 4:
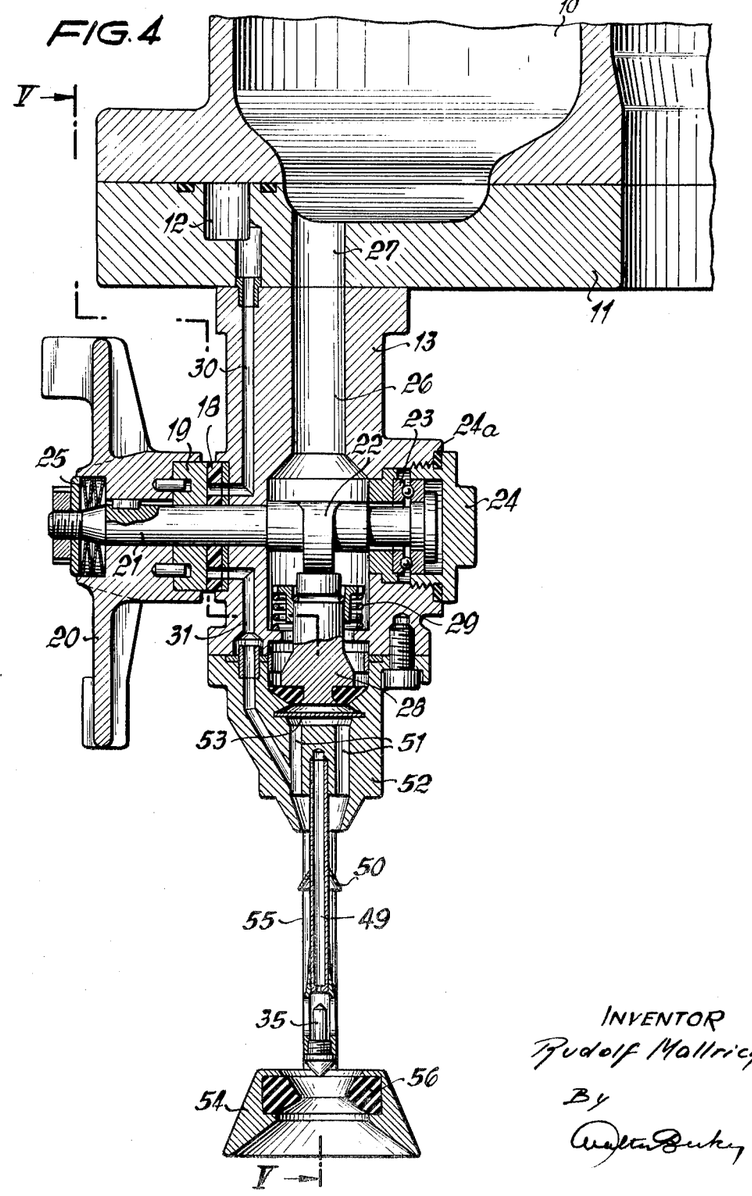
FIG. 4 is a vertical section similar to that of FIG. 1 through a modified filling apparatus according to the invention without filling tube.

The arrangement of FIG. 4 corresponds to that of FIG. 1 with the exception that the lower portion 14 of FIG. 1 has been replaced by a member 52 having connected thereto a return air tube 49 provided with a deflector 50. The return conduit 49 is open at its lower end and it is up to this point that the liquid rises in the bottle. The liquid passes through the opened valve 28 and bores 51, passes around the return air tube 49, flows along the deflector 50 so as to diverge and then flows down the wall of the bottle to be filled. The equalizing conduit 31 is contained in part 52 so that also with a filling arrangement having no filling tube, the same control will be effected as has been outlined in connection with FIGS. 9 and 10. Below valve 28 there is in conformity with FIG. 4 provided a screen or sieve 53 by means of which the liquid is to be distributed. The vessel to be filled is in a manner known per se centered by a centering bell 54 which latter is guided by bars 55. A seal 56 serves for sealing between the neck of the bottle to be filled and the lower end of member 52.

Figure 5:
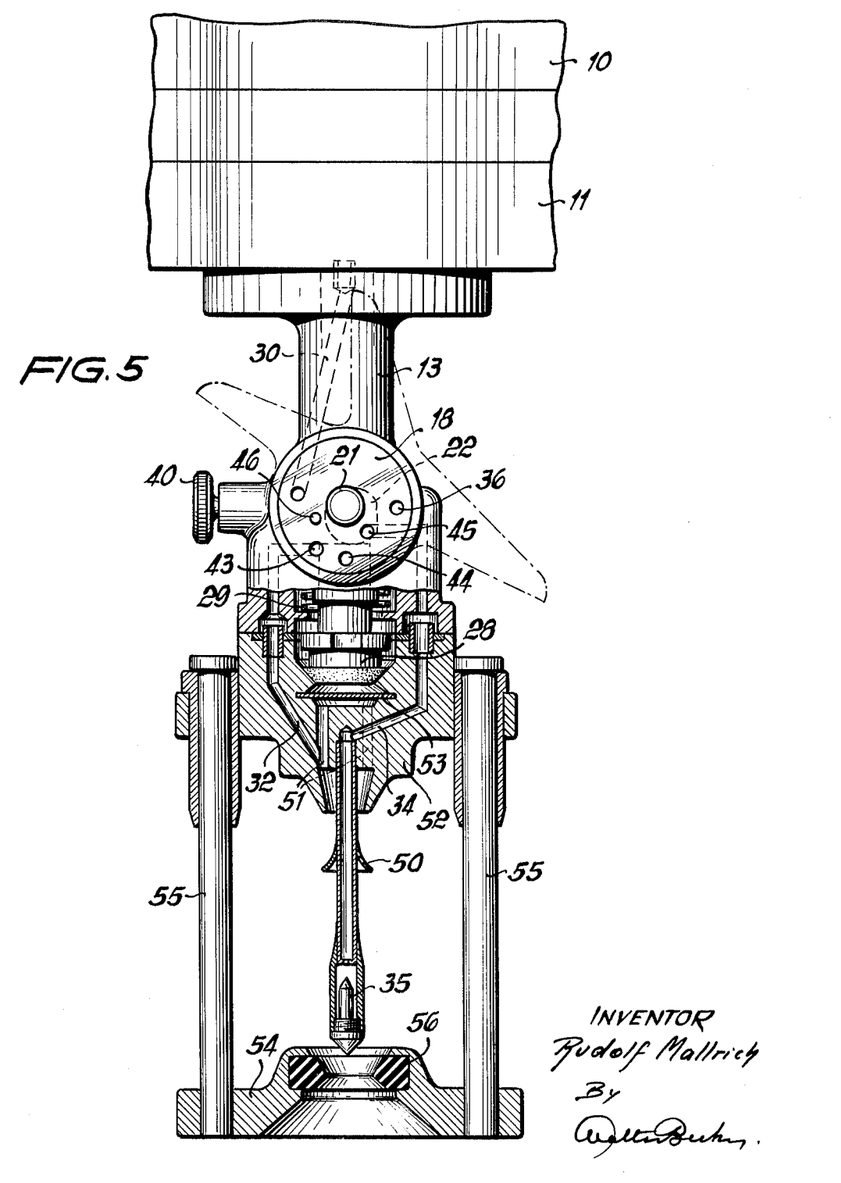
FIG. 5 is a section taken along the line V—V of FIG. 4.

In FIGS. 4 and 5 the float 35 which, in FIGS. 1 and 2 is arranged in the lower portion of the discharging member, is arranged at that opening of the return air pipe which is adjacent the bottle. The float is guided in a housing provided with lateral openings and with an opening leading to the mouth of the return air pipe. The housing concentrically surrounds the free end of the return air pipe. In the filling position, the fluid passes through the mouth into the pressed-on bottle while the return air passes through the lateral openings into the float housing and flows from there through the opening released by the float into the return air tube. When the fluid level passes to a certain plane in the bottle neck, the float lifted by the fluid closes the opening leading to the mouth of the return air pipe and thereby completes the filling operation.

It is, of course, to be understood that the present invention is, by no means, limited to the particular constructions shown in the drawings but also comprises any modifications within the scope of the appended claims. Thus, instead of air referred to hereinbefore, also another gas, as for instance an inert gas, may be employed.

What I claim is:

1. In a filling machine for filling vessels with liquid under counter pressure: housing means comprising separate, independent chamber means for containing, respectively, preloading gas, return gas, and liquid, a filling head for engaging a vessel to be filled, separate conduit means leading from the respective chamber means to said filling head for individual communication with said vessel to be filled, gas control valve means mounted on said filling head for controlling the passage of preloading gas and return gas through the respective conduit means leading from the chamber therefor, liquid control valve means including a separate valve member mounted in the liquid conduit means in said filling head and movable from an open position to a position to close said liquid conduit means leading to said vessel to be filled, and operating means interconnecting said gas control valve means and said liquid control valve means for automatic control of the liquid valve means in conformity with certain positions of said gas control valve means.

2. In a filling machine for filling vessels with liquid under counter pressure: a filling head for engaging a vessel to be filled, a source of liquid and a liquid conduit leading from said liquid source through said filling head for opening into said vessel, a separate source of preloading gas under pressure and a preloading gas conduit leading from said gas source to said filling head for opening into said vessel, and a return gas receiver and a return gas conduit for gas from a vessel engaging said filling head leading to said return gas container, gas control valve means for controlling passage of preloading gas and return gas through said gas conduits, liquid control valve means including a separate valve member in said liquid conduit and movable from an open position for passage of liquid to a position to close said liquid conduit, and operating mechanism controlling the operation of said valve member in said liquid conduit and said valve means in said gas conduits in proper sequence to fill said vessel with liquid from said liquid chamber and control flow of gas in said gas conduits.

3. In a filling machine for filling vessels with liquid under counter pressure: a filling head for engaging a vessel to be filled and three separate conduits connected to said head including, a liquid conduit leading from a source of liquid through said filling head for opening into said vessel, a preloading gas conduit leading from a source of preloading gas under pressure to said filling head for opening into said vessel, and a return gas conduit leading from a vessel engaging said filling head to a return gas receiver, gas control valve means on said filling head including a valve member movable to different positions and having means to control flow through said gas conduits, liquid control valve means including a separate valve member in the liquid conduit in said filling head and movable from an open position for passage of liquid to a position to close said liquid conduit, and an operating member mounted on said filling head and controlling the operation of said valve members in proper sequence to fill said vessel with liquid from said source of liquid and to control flow of gas in said gas conduits.

4. In a filling machine for filling vessels with liquid under counter pressure: a filling head for engaging a vessel to be filled and three separate conduits connected to said head including, a liquid conduit leading from a source of liquid through said filling head for opening into said vessel, a preloading gas conduit leading from a source of preloading gas under pressure to said filling head for opening into said vessel, and a return gas conduit leading from a vessel engaging said filling head to said filling head and to a return gas receiver, gas control valve means including a rotary valve member mounted externally on said filling head and having means to control flow through said gas conduits, liquid control valve means including a separate valve member in the liquid conduit in said filling head and movable from an open position for passage of liquid to a position to close said liquid conduit, and an operating shaft journalled in said filling head controlling the operation of said valve members in proper sequence on rotation of said shaft to fill said vessel with liquid from said source of liquid and to control flow of gas through said gas conduits.

5. In a filling machine as in claim 4, in which said gas control valve means includes a rotary valve member mounted on said operating shaft and said shaft is formed with an eccentric engaging said separate valve member to move said separate valve member to an open position.

6. In a filling machine for filling vessels with liquid under counter pressure: housing means comprising separate conduit means for connection to separate, independent chamber means for preloading gas, return gas, and liquid, respectively, gas control valve means mounted on said housing means for controlling the passage of preloading gas and return gas through the respective conduit means therefor, liquid control valve means including a separate valve member movably mounted in said housing means for opening and closing said liquid conduit means to the passage of liquid into a vessel to be filled, and means operatively interconnecting said gas control valve means and said liquid control valve means for automatic sequential operation, said gas control valve means also being movable into a position for establishing connection between the conduit means for said preloading gas and the conduit means for said return gas.

7. In a filling machine for filling vessels with liquid under counter pressure: housing means comprising separate conduit means for connection to separate, independent chamber means for preloading gas, return gas, and liquid, respectively, gas control valve means mounted on said housing means for controlling the passage of preloading gas and return gas through the respective conduit means therefor, liquid control valve means including a separate valve member movably mounted in said housing means for opening and closing said liquid conduit means to the passage of liquid into a vessel to be filled, means operatively interconnecting said gas control valve means and said liquid control valve means for automatic sequential operation, and additional conduit means leading to exhaust and controllable by said gas control valve means and operable to relieve pressure in the conduit means for said preloading gas.

8. In a filling machine for filling vessels with liquid under counter pressure: housing means comprising separate conduit means for connection to separate, independent chamber means for preloading gas, return gas, and liquid, respectively, gas control valve means mounted on said housing means for controlling the passage of preloading gas and return gas through the respective conduit means therefor, liquid control valve means including a separate valve member movably mounted in said housing means for opening and closing said liquid conduit means to the passage of liquid into a vessel to be filled, tube means connected to said housing means for extending into a vessel to be filled, valve means arranged in said conduit means for the return gas and operable to close said last conduit means by rising liquid in said tube means, bypass means bypassing said last valve means, means operatively interconnecting said gas control valve means and said liquid control valve means for automatic sequential operation, and passage means controllable by said gas control valve means in the position of the latter for passing preloading gas through the conduit means therefor for making said bypass means effective, thereby permitting direct return of the return gas to said chamber means therefor.

9. In a filling machine as in claim 8, in which said gas control valve means includes additional control means for controlling the release of liquid through said return gas conduit.

10. In a filling machine for filling vessels with liquid under counter pressure: housing means comprising separate conduit means for conveying therethrough, respectively, preloading gas, return gas, and liquid, control valve means movably mounted in said conduit means for liquid for controlling the passage of liquid through said liquid conduit means into a vessel to be filled, rotary disc valve means associated with said conduit means for preloading gas and return gas, respectively, said rotary disc valve means including sealing means, and means for exerting sealing pressure on said sealing means, rotary shaft means connected to said disc valve means and provided with eccentric means for controlling said control valve means, said eccentric means being in said liquid conveying conduit means and adjacent said control means, and thrust bearing means mounted in said filling head means for receiving the sealing pressure exerted on said sealing means, said eccentric means being operable in response to certain positions of said shaft means to control the operation of said control valve means.

References Cited by the Examiner

UNITED STATES PATENTS

| | | | |
|---|---|---|---|
| 1,985,767 | 12/1934 | De Markus | 141—57 X |
| 2,145,765 | 1/1939 | Huntley et al. | 141—57 |
| 2,663,483 | 12/1953 | Day et al. | 141—57 |
| 2,770,263 | 11/1956 | Breeback | 141—48 X |
| 2,779,358 | 1/1957 | Fechheimer | 141—48 X |
| 2,783,785 | 3/1957 | Day et al. | 141—48 |

FOREIGN PATENTS 1,058,386  5/1959  Germany.

LAVERNE D. GEIGER, *Primary Examiner.*

V. M. DINICOLA, E. J. EARLS, *Assistant Examiners.*